US008653773B2

(12) United States Patent
Brown et al.

(10) Patent No.: US 8,653,773 B2
(45) Date of Patent: Feb. 18, 2014

(54) METHOD FOR CALIBRATING A DRIVE MOTOR FOR A TONER METERING DEVICE IN AN IMAGING APPARATUS

(75) Inventors: Timothy Leo Brown, Lexington, KY (US); Totsuka Kenji, Lexington, KY (US)

(73) Assignee: Lexmark Internatonal, Inc., Lexington, KY (US)

( * ) Notice: Subject to any disclaimer, the term of this patent is extended or adjusted under 35 U.S.C. 154(b) by 183 days.

(21) Appl. No.: 13/364,676

(22) Filed: Feb. 2, 2012

(65) Prior Publication Data
US 2013/0202275 A1    Aug. 8, 2013

(51) Int. Cl.
*H02P 7/285*    (2006.01)

(52) U.S. Cl.
USPC ............... 318/400.34; 388/800; 388/928.1

(58) Field of Classification Search
USPC ....................... 388/800–841, 928.1
See application file for complete search history.

(56) References Cited

U.S. PATENT DOCUMENTS

| | | | |
|---|---|---|---|
| 6,954,044 B2* | 10/2005 | McMillan et al. ....... | 318/400.34 |
| 2003/0235409 A1* | 12/2003 | Harriman et al. ............ | 388/804 |
| 2005/0117245 A1* | 6/2005 | Park et al. ....................... | 360/75 |
| 2006/0097681 A1* | 5/2006 | Ang et al. ...................... | 318/560 |
| 2007/0007072 A1* | 1/2007 | Ta et al. ......................... | 180/446 |
| 2008/0030891 A1* | 2/2008 | Kim et al. ................... | 360/78.06 |
| 2009/0015961 A1* | 1/2009 | Kusumoto ....................... | 360/75 |
| 2010/0329724 A1* | 12/2010 | Maeda ............................ | 399/76 |
| 2011/0074327 A1* | 3/2011 | Paintz et al. ............ | 318/400.35 |
| 2011/0095713 A1* | 4/2011 | Son et al. ................. | 318/400.11 |
| 2011/0115423 A1* | 5/2011 | Kern et al. ............... | 318/400.35 |
| 2012/0281311 A1* | 11/2012 | Ishihara et al. ........... | 360/78.06 |

OTHER PUBLICATIONS

Vasilios, C.I.; Nikolaos, I.M., "PMSM sliding mode observer for speed and position estimation using modified back EMF," Power Electronics and Motion Control Conference, 2008. EPE-PEMC 2008. 13th , vol., no., pp. 1105,1110, Sep. 1-3, 2008.*

* cited by examiner

*Primary Examiner* — Eduardo Colon Santana
*Assistant Examiner* — Said Bouziane
(74) *Attorney, Agent, or Firm* — John Victor Pezdek (57) ABSTRACT

In an imaging apparatus having a toner container, a method of periodically calibrating a back EMF constant Ke used in a speed control circuit of a DC motor used for driving for a toner metering device. To adjust the value of the back EMF constant Ke, the method uses a plurality of sampled back EMF measurements together with a calculated actual speed of rotation of the toner metering device as measured using motion sensor.

14 Claims, 8 Drawing Sheets

METHOD FOR CALIBRATING A DRIVE MOTOR FOR A TONER METERING DEVICE IN AN IMAGING APPARATUS

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to motor speed controls, and more particularly to those used for toner metering devices.

2. Description of the Related Art

In electrophotographic imaging apparatus, motor driven toner metering devices are used to convey toner from a toner reservoir for use in the imaging unit of the imaging apparatus. DC motors are typically used to drive toner feed mechanisms. A brush DC motor can provide enough torque and speed range to drive the toner metering system. Accurate rotational speed control of these motors ensures reliable operation of the imaging apparatus. To achieve good speed control, a way to measure the motor speed accurately is needed. There are several methods to measure a speed of a brush DC motor. One could mount an encoder, such as an optical or magnetic encoder on the motor shaft in such a way to produce pulses as the motor shaft rotates. These sensors provide highly accurate information about the motor speed, however, they add about cost in material and in assembly.

One example speed control system uses a brush DC motor with a single channel encoder mounted on the back. However a single channel encoder cannot tell the direction of the motor rotation so an additional sensor is needed to determine rotational direction of the toner metering device. Also with a single channel encoder any signals generated from vibrations or electrical noise will cause the accurate information of the toner metering mechanism to be lost. A quadrature encoder which provides information about direction as well as speed could be used. However, the quadrature encoders are expensive. A stepper motor, which advances one step for each step command, allows control of exact motor position. This solution could thereby eliminate the need for the additional directional sensor. One potential problem is that when the stepper motor is turned off, there is no guarantee that the stepper motor can start at the same position, leading to some uncertainty about the position of the toner metering device. Stepper motors are also prone to acoustical noise and excessive power consumption due to their extremely inefficient operation.

An alternate way to measure motor rotational speed is to use the back EMF feedback from the DC motor. It is known that when a brush DC motor turns, it generates a voltage across its winding. The voltage is called the back EMF voltage and it is proportional to the rotational speed of the motor as shown by the following equation;

$$V_{emf} = K_e \cdot \omega [\text{Volt}] \quad \text{Eq. 1}$$

where $V_{emf}$ is the back EMF voltage in volts, Ke, is the back EMF constant of the motor in volt-s/rad, and $\omega$ is the rotational speed of the motor in rad/s. The motor speed can be estimated by measuring the motor back EMF voltage and dividing it by the back EMF constant Ke. Motor speed control can be performed using the measured speed from the back EMF feedback. The back EMF speed control is an economical solution because it does not require any sensors or encoders on the motor and the electrical sampling circuitry for sampling or measuring the back EMF voltage $V_{emf}$ is quite simple. However, one drawback of the technique is that the measured speed is only as accurate as the estimation of the back EMF constant Ke. The back EMF constant Ke could differ as much as +/−15% from motor to motor at the beginning of life, and +/−25% over the life of a motor. For some applications, this amount of error in motor speed is unacceptable.

It would be advantageous to be able to perform a back EMF feedback calibration to periodically update the back EMF constant Ke without having to use encoders on the motor. It would further be advantageous to use for the calibration input from an existing sensor in the toner feeding mechanism.

SUMMARY

In an imaging apparatus having a toner container, a method of adjusting a back EMF constant Ke used in a speed control system for a DC motor connected via a gear train to a rotatable toner metering device is set out herein. The method comprises storing an initial value for Ke; and during a motor calibration cycle:

measuring a time of at least one rotation of the toner metering device;

making a plurality of back EMF measurements of the DC motor;

averaging the plurality of back EMF measurements;

calculating an estimated speed of the DC motor using the initial value of Ke and the average value of the plurality of back EMF measurements;

calculating an actual speed of the DC motor using the time of at least one rotation and a gear ratio of the connecting gear train;

adjusting the stored value of Ke by multiplying the stored value of Ke by the ratio of the estimated speed to the actual speed; and storing the adjusted value of Ke in place of the previously stored value for Ke for the use in a next motor calibration cycle.

In another form, the motor calibration cycle is performed after an installation of a new toner container in the imaging apparatus, a predetermined amount of time after initial use of the toner container in the imaging apparatus, or after a predetermined number of cycles of the toner metering apparatus. The motor calibration cycle may be performed during an idle state of the DC motor.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Spatially relative terms such as "top", "bottom", "front", "back", "rear" and "side" "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the present disclosure and that other alternative mechanical configurations are possible.

The term "image" as used herein encompasses any printed or digital form of text, graphic, or combination thereof. The term "output" as used herein encompasses output from any printing device such as color and black-and-white copiers, color and black-and-white printers, and so-called "all-in-one devices" that incorporate multiple functions such as scanning, copying, and printing capabilities in one device. Such printing devices may utilize ink jet, dot matrix, dye sublimation, laser, and any other suitable print formats. The term button as used herein means any component, whether a physical component or graphic user interface icon, that is engaged to initiate output.

Figure 1:
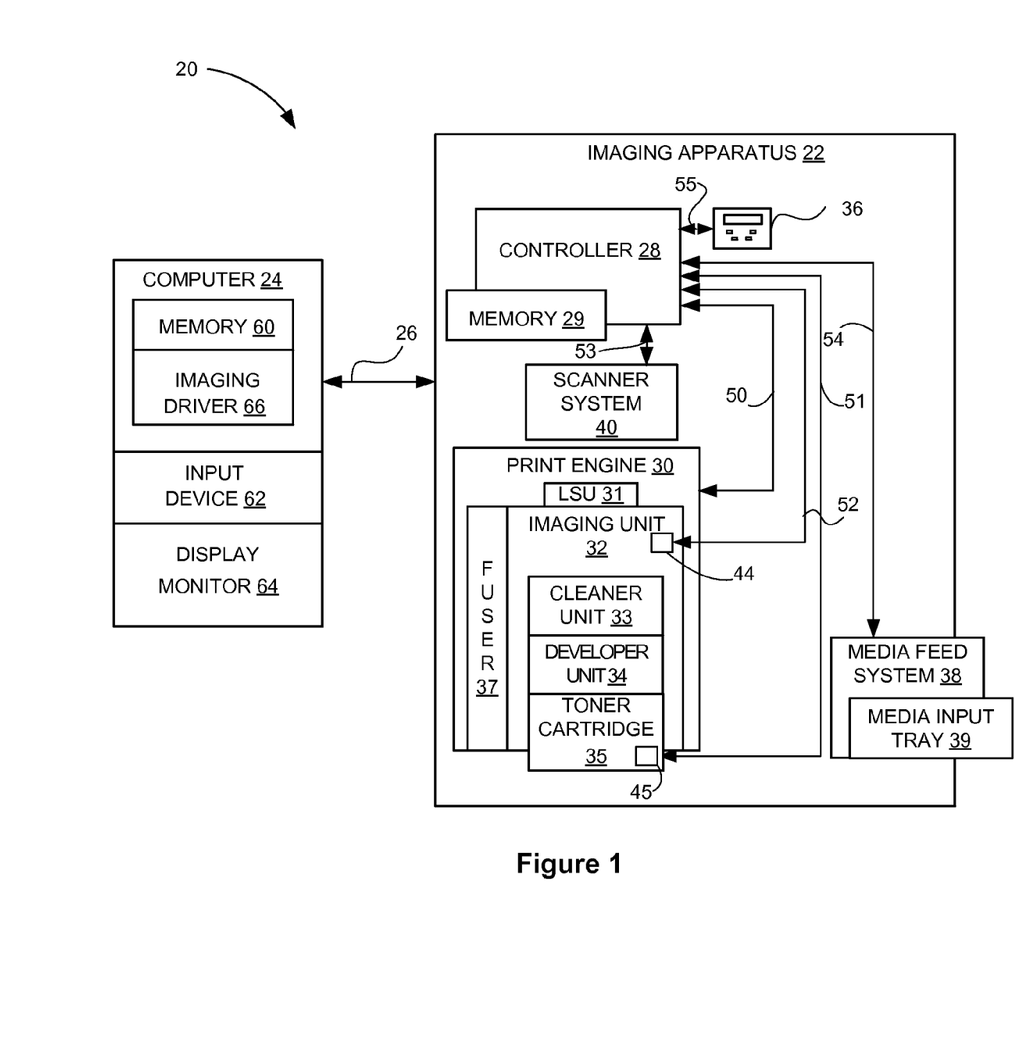
FIG. 1 is a schematic illustration of an example imaging system utilizing the present invention.

Referring now to the drawings and particularly to FIG. 1, there is shown a diagrammatic depiction of an imaging system 20 embodying the present invention. As shown, imaging system 20 may include an imaging apparatus 22 and a computer 24. Imaging apparatus 22 communicates with computer 24 via a communications link 26. As used herein, the term "communications link" is used to generally refer to structure that facilitates electronic communication between multiple components, and may operate using wired or wireless technology and may include communications over the Internet. Imaging system 20 may be, for example, a customer imaging system, or alternatively, a development tool used in imaging apparatus design.

In the embodiment shown in FIG. 1, imaging apparatus 22 is shown as a multifunction machine that includes a controller 28, a print engine 30, a laser scan unit (LSU) 31, an imaging unit 32, a cleaner unit 33, a developer unit 34, a toner cartridge 35, a user interface 36, a media feed system 38 and media input tray 39 and a scanner system 40. Imaging apparatus 22 may communicate with computer 24 via a standard communication protocol, such as for example, universal serial bus (USB), Ethernet or IEEE 802.xx. A multifunction machine is also sometimes referred to in the art as an all-in-one (AIO) unit. Those skilled in the art will recognize that imaging apparatus 22 may be, for example, an electrophotographic printer/copier including an integrated scanner system 40; or a standalone scanner system 40.

Controller 28 includes a processor unit and associated memory 29, and may be formed as one or more Application Specific Integrated Circuits (ASICs). Memory 29 may be any volatile on non-volatile memory or combinations thereof such as, for example, random access memory (RAM), read only memory (ROM), flash memory, and/or non-volatile RAM (NVRAM). Alternatively, memory 29 may be in the form of a separate electronic memory (e.g., RAM, ROM, and/or NVRAM), a hard drive, a CD or DVD drive, or any memory device convenient for use with controller 28. Controller 28 may be, for example, a combined printer and scanner controller.

In the present embodiment, controller 28 communicates with print engine 30 via a communications link 50. Controller 28 communicates with imaging unit 32 and processing circuitry 44 thereon via a communications link 52. Controller 28 communicates with toner cartridge 35 and processing circuitry 45 therein via a communications link 51. Controller 28 communicates with media feed system 38 via a communications link 54. Controller 28 communicates with scanner system 40 via a communications link 54. User interface 36 is communicatively coupled to controller 28 via a communications link 55.

Processing circuit 44 and 45 may provide authentication functions, safety and operational interlocks, operating parameters and usage information related to imaging unit 32 or toner cartridge 35, respectively. Controller 28 serves to process print data and to operate print engine 30 during printing, as well as to operate scanner system 40 and process data obtained via scanner system 40.

Computer 24, which may be optional, may be, for example, a personal computer, network server, tablet computer, smart phone or other hand-held electronic device, including memory 60, such as volatile and/or non-volatile memory, input device 62, such as a keyboard, and a display, such as monitor 64. Computer 24 further includes a processor, input/output (I/O) interfaces, and may include at least one mass data storage device, such as a hard drive, a CD-ROM and/or a DVD unit (not shown).

Computer 24 includes in its memory a software program including program instructions that function as an imaging driver 66, e.g., printer/scanner driver software, for imaging apparatus 22. Imaging driver 66 is in communication with controller 28 of imaging apparatus 22 via communications link 26. Imaging driver 66 facilitates communication between imaging apparatus 22 and computer 24. One aspect of imaging driver 66 may be, for example, to provide formatted print data to imaging apparatus 22, and more particularly, to print engine 30, to print an image. Another aspect of imaging driver 66 may be, for example, to facilitate collection of scanned data.

In some circumstances, it may be desirable to operate imaging apparatus 22 in a standalone mode. In the standalone mode, imaging apparatus 22 is capable of functioning without computer 24. Accordingly, all or a portion of imaging driver 66, or a similar driver, may be located in controller 28 of imaging apparatus 22 so as to accommodate printing and scanning functionality when operating in the standalone mode.

Print engine 30 may include a laser scan unit (LSU) 31, an imaging unit 32, a toner cartridge 35, and a fuser 37, all mounting within imaging apparatus 22. The imaging unit 32 further includes a cleaner unit 33 housing a waste toner removal system and a photoconductive drum, a developer unit 34 that are removably mounted within imaging unit 32. In one embodiment the cleaner unit 33 and developer unit 34 are assembled together and installed into a frame of the imaging unit 32. The toner cartridge 35 is then installed in the frame in a mating relation with the developer unit 34. Laser scan unit 31 creates a latent image on the photoconductive drum in the cleaner unit 33. The developer unit 34 has a toner sump containing toner which is transferred to the latent image on the photoconductive drum to create a toned image. The toned image is subsequently transferred to a media sheet received in the imaging unit 32 from media input tray 38 for printing. Toner remnants are removed from the photoconductive drum by the waste toner removal system. The toner image is bonded to the media sheet in the fuser 37 and then sent to an output location or to one or more finishing options such as a duplexer, a stapler or hole punch.

The toner cartridge 35 removably mates with the developer unit 34 in imaging unit 32. An exit port on the toner cartridge 35 communicates with an inlet port on the developer unit 34 allowing toner to be periodically transferred from the toner cartridge 35 to resupply the toner sump in the developer unit 34.

Figure 2:
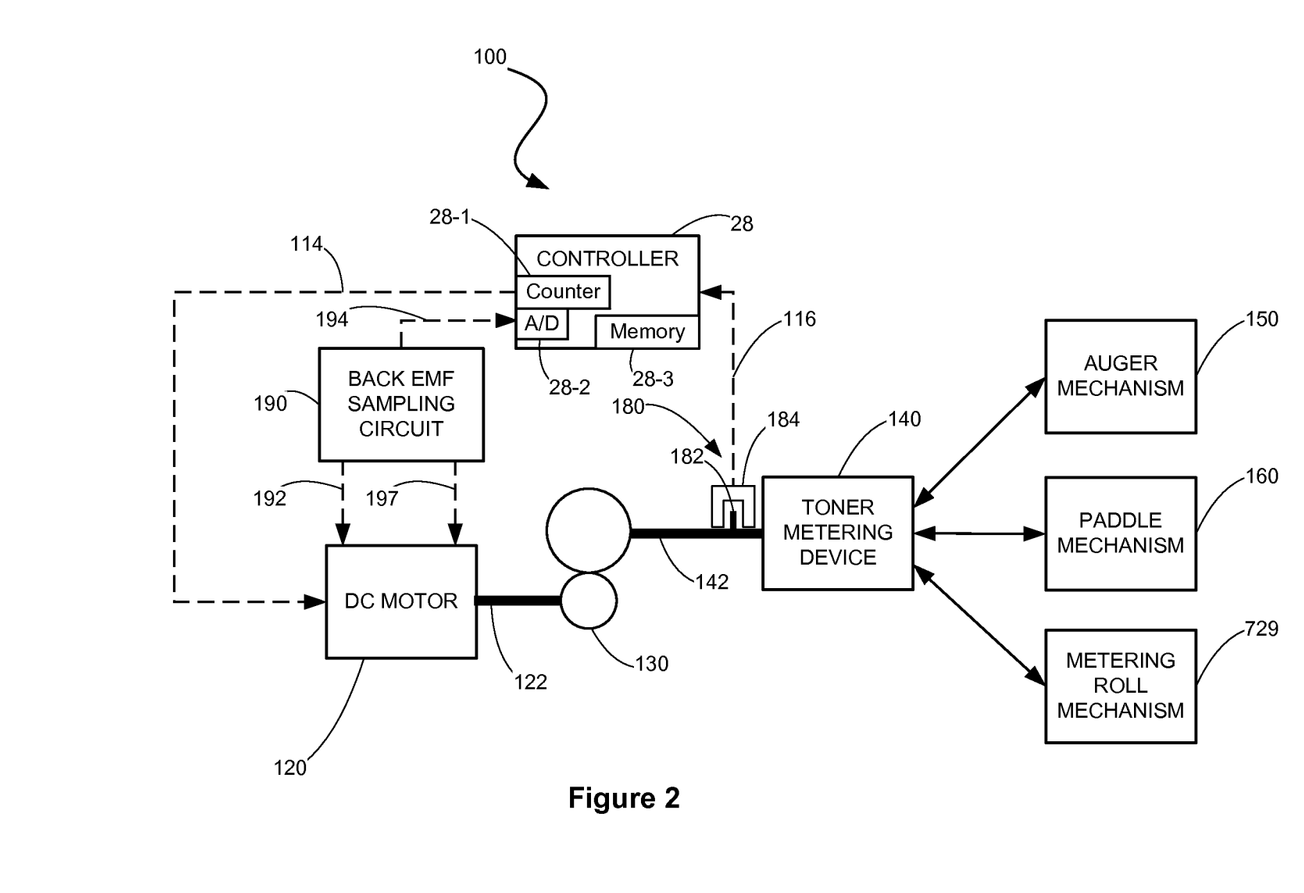
FIG. 2 is a schematic illustration of a motor control system for a toner metering system of the present invention.

FIG. 2 schematically illustrates the motor control system 100 of the present invention. In FIG. 2, electrical communication between elements is shown using dashed lines while mechanical coupling is indicated by the use of thick solid lines. Controller 28 is in communication via line 114 with drive motor 120 that is mechanically coupled to a gear train 130, via output shaft 122. Gear train 130 is in turn mechanically coupled to one of more driven devices. As shown gear train 130 is coupled to a toner metering device 140 via shaft 142 and provides torque from DC drive motor 120 to toner metering device 140.

Figure 6:
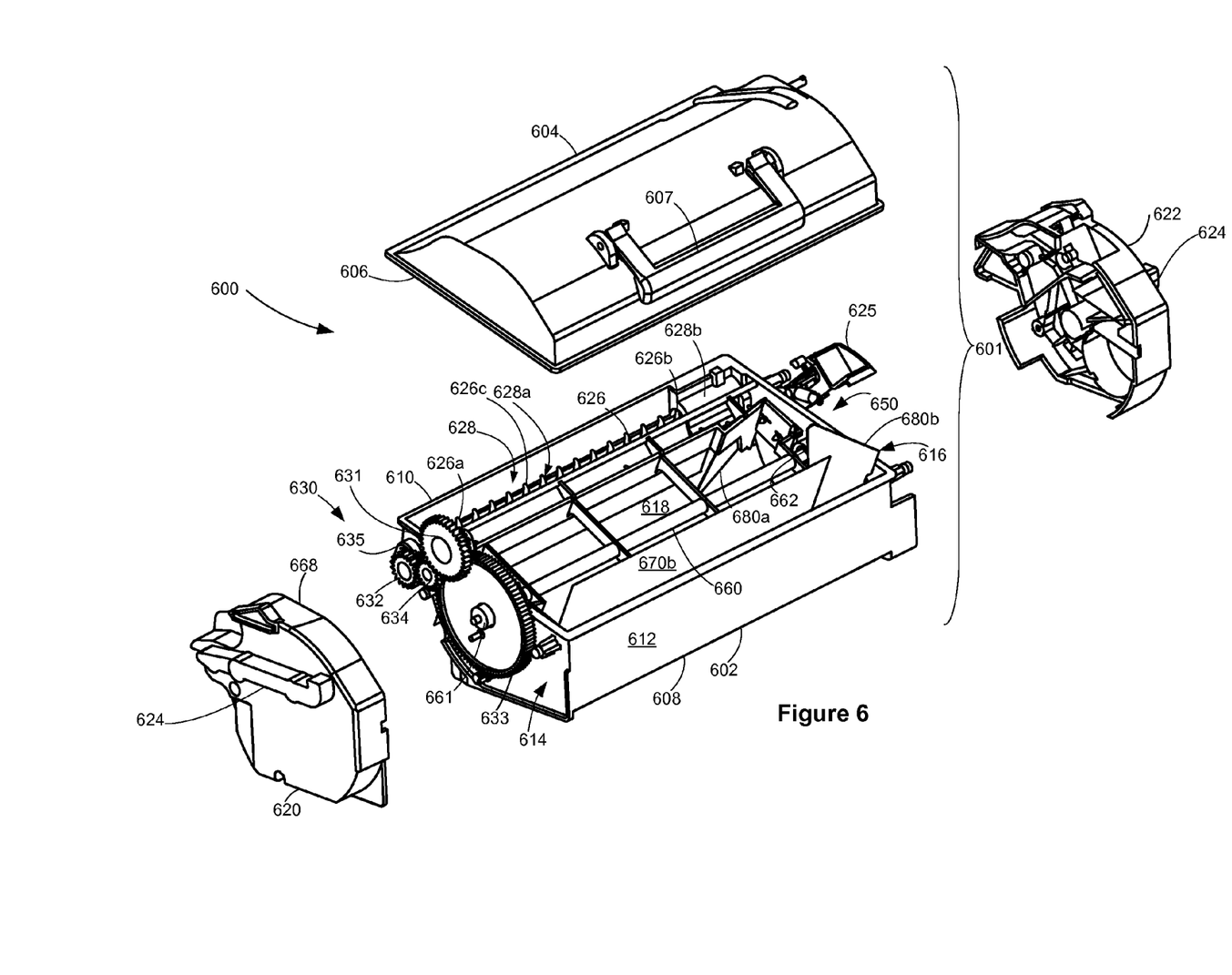
FIG. 6 is illustration of two example forms of toner metering devices for use with the present invention.
Figures 7, 8:
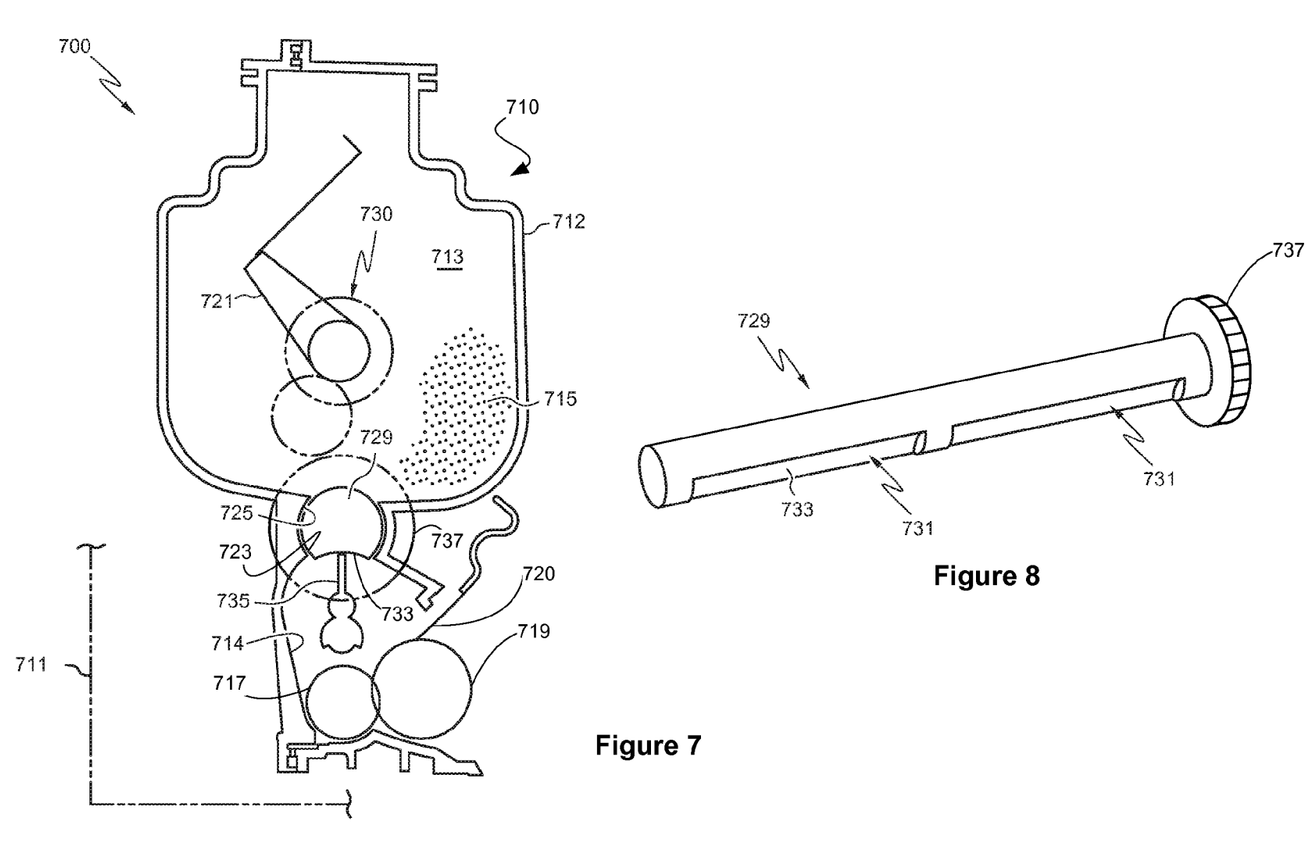
FIGS. 7 and 8 illustrate an example toner metering roll for use with the present invention.

Drive motor 120 is a brush DC motor. The number, size and arrangement of gears comprising gear train 130 is dependent on the number of devices to be driven and the torque required to drive those devices. Toner metering device 140 may be a device of any rotatable configuration including an auger 150, a paddle assembly 160 or a metering roll 170 for delivering controlled amounts of toner to the imaging device. FIGS. 6-8 illustrate example embodiments of auger mechanism 150, paddle mechanism assembly 160 and metering roll mechanism 729.

A motion sensor assembly 180 is provided on toner metering device 140 remotely from drive motor 120. In one form the motion sensor assembly 180 comprises a flag 182 mounted on shaft 142 of toner metering device 140 and a sensor 184. The output of sensor 184 is in communication with controller 28 via line 116. When flag 182 passes through sensor 184, its output changes state upon detection of the flag 182 allowing the rotational speed of toner metering device 140 to be determined by controller 112 as described in further detail herein. Sensor 184 may be a photodiode, optical sensor, infrared sensor, capacitive sensor, inductive sensor or magnetic sensor as is known to those of ordinary skill in the art. While a single flag 182 is shown, two or more flags may also be used so as to decrease the period between state changes in the output of sensor 184.

Sampling circuit 190 samples the back EMF voltage $V_{emf}$ values of DC motor 120 via lines 192, 197. Sampling circuit 190 provides for a series of back EMF voltage measurements which are then averaged. The number of measurements of back EMF voltage $V_{emf}$ and its values are stored in controller 28 for further processing. The output of sampling circuit 190 is provided to controller 28 via line 194. Although sampling circuit 190 is shown as being separate from controller 28, it may be integrated into controller 28 or DC motor 120.

For a typical toner metering device, DC motor 120 may operate at a steady state speed in the range of 400 rpm to 600 rpm while because of the gear train 130, the toner metering device 140 may operate in the range of 8 rpm to 12 rpm. Because of this difference in speed, a high number of back EMF voltage values can be measured during a single revolution of the toner metering device 140. Typically, the time interval needed to obtain a back EMF voltage sample is in the range of about 10 ms to about 20 ms. For the rotational speed range of the toner metering devices the number of samples taken during one cycle can be in the range of 250 to 750. The number of back EMF voltage samples taken is a matter of design choice.

Figure 3:
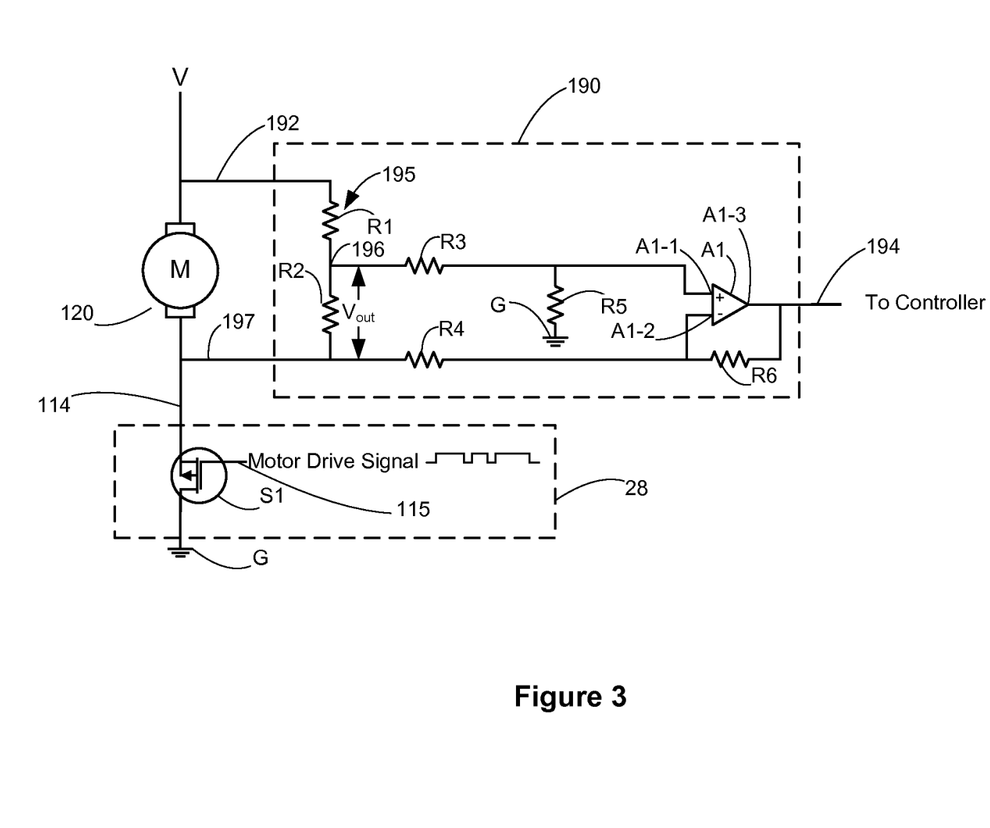
FIG. 3 is a schematic of an example DC motor drive circuit and an example back EMF sampling circuit.

An example of a drive circuit for DC motor 120 and sampling circuit 190 is illustrated in FIG. 3. The circuit driving DC motor 120 comprises DC motor 120 and switch S1. DC motor 120 is illustrated as being connected to a supply voltage V via line 192 and connected in series with switch 51 via line 114. Switch 51 is in turn connected to ground G. Operation of switch 51 is controlled by controller 28 via motor drive signal 115. Motor drive signal 115 is a pulse width modulated signal that turns switch 51 off and on allowing DC motor 120 to start and stop as is known. Switch 51 is illustrated as being a FET device but any suitable switching device may be used to turn DC motor 120 on and off and is a matter of design choice. While switch 51 is shown connected between the DC motor 120 and ground G, it may be connected between the supply voltage V and DC motor 120.

The back EMF voltage $V_{emf}$ across DC motor 120 is measured using sensing circuit 190. A voltage divider 195 formed by the series connected resistors R1 and R2 is placed in parallel across DC motor 120 at line 192 and return line 197. The output voltage $V_{out}$ is provided to a high impedance circuit formed by operational amplifier A1 and resistors R3-R6. The output 196 between resistors R1 and R2 is connected to resistor R3 that is in turn connected to a first input A1-1 of amplifier A1, the plus input is shown, while the return line 197 of voltage divider 195 is connected to a second input A1-2 of operational amplifier A1, the minus input is shown, via resistor R4. Resistor R5 is connected between the first input A1-1 and ground. Resistor R6 forms a feedback loop from an output A1-3 of amplifier A1 to the second input A1-2. The output A1-3 is connected via line 194 to controller 28 where it is sampled and stored. Resistors R1 and R2 may have example values of 90K ohms and 10K ohms, respectively. Resistor R3-R6 may each have example values of 1M ohms. Amplifier A1 may be a model TL3472 made by Texas Instruments, Inc. Other resistive values or amplifiers may be used for constructing sampling circuit 190.

Referring to FIG. 2, at controller 28, the number of back EMF voltage samples are counted in counter 28-1 and the corresponding back EMF voltage values are converted to a digital form at analog to digital (A/D) converter 28-2. The back EMF voltage values, sample count, and back EMF constants Ke and $Ke_{est}$ are stored in memory 28-3 for processing in accordance with the process described in FIGS. 4A-4B. Counter 28-1, A/D converter 28-2 and memory 28-3 may be provide integral to controller 28 or in additional circuitry in communication with controller 28.

During a toner metering cycle, the toner metering device is rotated one revolution as sensed by sensor 184. As it rotates, the speed of the toner metering device needs to be controlled to be within +/−10% of the target speed. If the toner metering device rotates too fast, the toner may clog in the toner cartridge 35 or in the developer unit 34. If the toner metering device rotates too slowly, there may not be enough toner delivered to the developer unit 34 to create the requested image. For a monochromatic imaging device a single color of toner cartridge, for example, a black toner cartridge, with a toner metering system is provided. For a color imaging device uses black, cyan, magenta, and yellow toner cartridges are provided, and each color of toner cartridge has its own toner metering system described above.

In order to obtain accurate speed measurements for the DC motor used to drive the toner metering device, an accurate estimate of the back EMF constant, Ke, is needed. One way to improve the estimate of the back EMF constant is to perform a calibration using a remote sensor in the imaging apparatus 22. In the toner metering device, the toner metering sensor 184 provides a low frequency feedback signal of the position of the toner metering device. The sensor 184 generates a pulse for each revolution of the toner metering device, which is used to keep track of the amount of toner left in the toner cartridge. Controlling the speed of motor 120 speed using sensor 184 as direct speed feedback is not satisfactory as the feedback frequency is too low (3~6 seconds per feedback). Instead, sensor 184 can be used to calibrate the back EMF constant, Ke, and be used to calculate on the actual speed of the toner metering device and the DC motor 120. to improve the motor speed control accuracy to a satisfactory level.

Figure 4A:
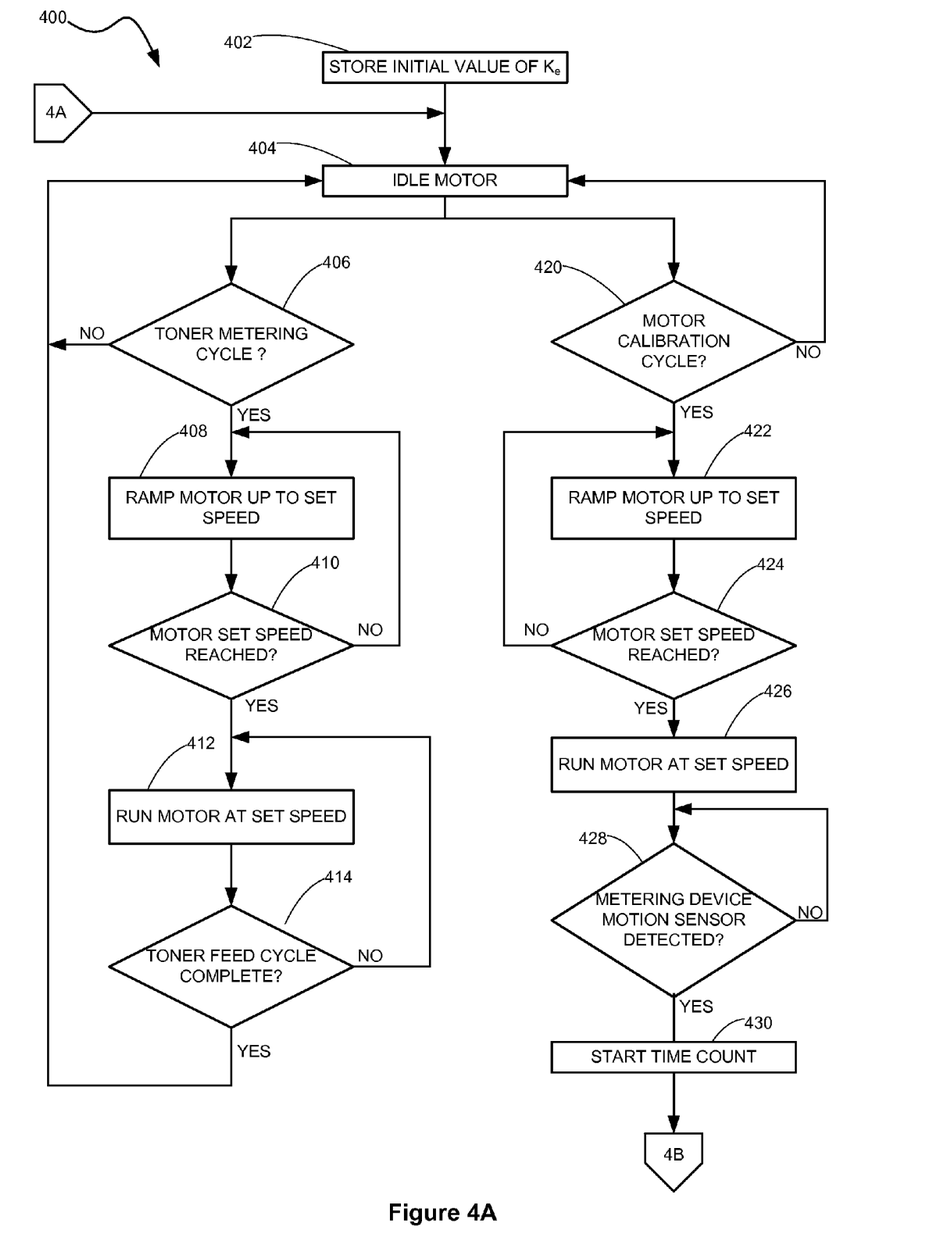
FIGS. 4A and 4B are a flow diagram of the calibration method of the present invention.
Figure 4B:
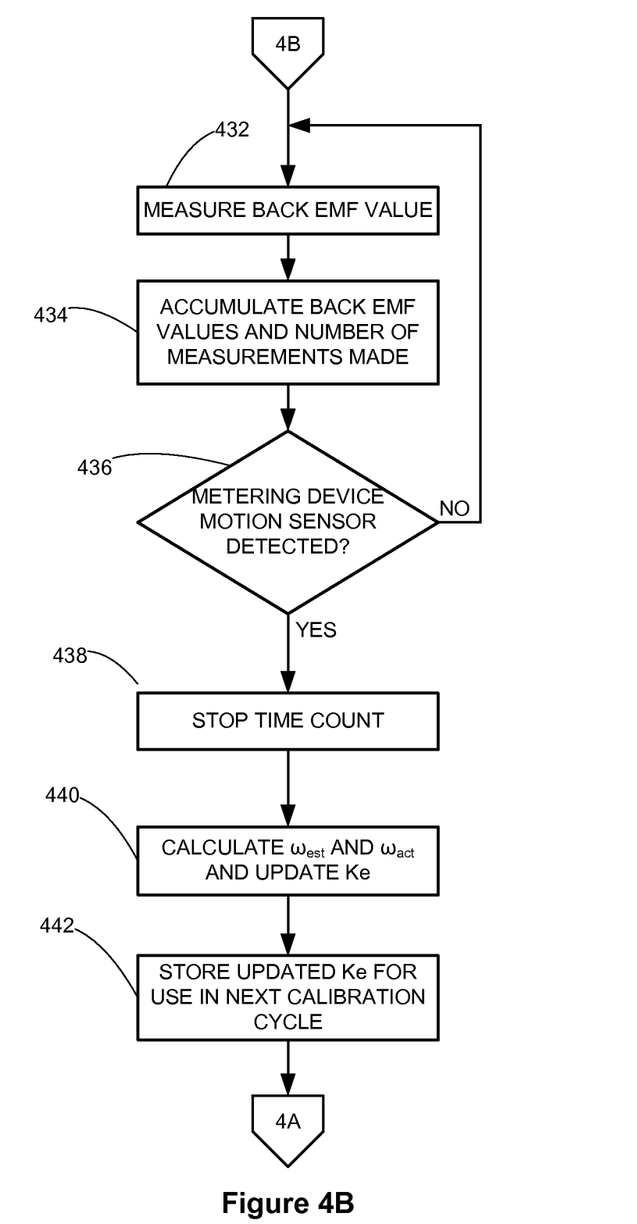

Referring to FIGS. 4A-4B, a state diagram or flow chart of the operation of the toner metering device and the calibration process 400 of the present disclosure is shown. The process 400 is shown beginning at state 402 where an initial value for back EMF constant Ke is provided. The process 400 proceeds to state 404 where the DC motor 120 is in an idle condition. At this point either a toner metering cycle can occur beginning at block 406 or a calibration cycle can occur beginning at block 420.

The process proceeds to block 404 to determine if a toner metering command has been received from controller 28. If NO, the process 400 returns to an idle motor condition at 404. If YES, the process 400 proceeds to block 408 where the DC motor 120 is turned on and ramped up to a predetermined speed, such as 500 rpm. This speed is a matter of design choice and based on the amount of toner needed to be delivered to the photoconductive drum to create the image, the diameter of the developer roll, and the diameter of the photoconductive drum etc. in the imaging unit 32.

At block 410 a determination is made if the motor speed has reached the desired speed. The motor speed can be estimated by measuring the motor back EMF voltage and dividing it by the stored initial value for the back EMF constant Ke or if a motor calibration has been run, an updated value for the back EMF constant Ke would be used. If NO, the process 400 returns to block 406. If YES, the motor is run at the set speed at block 412. Next, at block 414, it is determined if the toner feed cycle has been completed using the change of state in sensor 84. If YES, the process 400 returns to the idle motor state at block 404. If NO, the process 400 returns to block 412 continues to run the DC motor at set speed until completion of the toner metering cycle is sensed. Upon completion of the toner metering cycle, the process 400 returns to idle motor state at block 404.

The frequency of the calibration depends on the system requirement. If the system requires higher speed accuracy, the calibration needs to be performed more frequently. Controller 28 may call for a motor calibration upon the occurrence of one or more predetermined events. These events include the replacement of a toner cartridge, replacement of components within a toner cartridge or developer unit, replacement of DC motor 120, the passage of a predetermined amount of time, the passage of a predetermined number of toner metering cycles, the amount of toner remaining in a toner cartridge or developer unit, a request by a user of the imaging apparatus 22 to perform a motor calibration. For the toner metering systems, it is expected that performing the calibration each time the toner cartridge is replaced would be sufficient. This list of events is not meant to be limiting but is only illustrative of the events that may be used to trigger a motor calibration.

At block 420, the process 400 determined if a motor calibration event has occurred. If NO, the process returns to the idle motor state at block 404. If YES, the process 400 proceeds to block 422 where the DC motor 120 is turned on and ramped up to a predetermined speed, such as 500 rpm. At block 424 a determination is made if the motor speed has reached the desired speed. The motor speed can be estimated by measuring the motor back EMF voltage and dividing it by the stored initial value for the back EMF constant $Ke_{est}$, or if a motor calibration has been run, an updated value for the back EMF constant Ke would be used. If NO, the process 400 returns to block 422. If YES, the motor is run at the set speed at block 426. Because the toner metering device 140 rotates significantly slower than the DC motor 120, the DC motor will be up to speed in about 50 msec in that time the backlash in gear train 130 will be taken up and the gear train will have rotated the toner metering device only a few degrees.

Next, at block 428, the process 400 determines if the motion sensor on the toner metering device has been detected by sensing a change in the state of the output of sensor 184. If NO, the process 400 waits until the change of state in the output of sensor 184 is detected. If YES, the process 400 at block 430 starts a time count based on a change of state signal from sensor 184. Then, at block 430 a record average speed flag is set to beginning recording of back EMF. At blocks 430 and 432 the back EMF voltage values are measured and the measured values and number of samples taken is accumulated. At block 436 the process 400 determines if the motion sensor on the toner metering device has been detected by sensing a change in the state of the output of sensor 184. This indicates that the metering device has completed one revolution. If NO, the process 400 waits until the change of state in the output of sensor 184 is detected and continues taking back EMF voltage measurements. If YES, the process 400 at block 438 stops the time count.

It should be recognized that while the illustrated process 400 shows that the back EMF voltage measurements and sample count occur over the entire metering cycle of the toner metering device, a smaller time period may be used or a predetermined sample count may be used.

At block 440, the estimated average speed ($\omega_{est}$) and the actual speed ($\omega_{act}$) for DC motor 120 can be calculated as follows:

$$\omega_{est} = \frac{acc\_speed}{n} [1/Ke_{est}] \qquad \text{Eq. 2}$$

where acc_speed is the accumulated value of the back EMF voltage measurements and n is the number of back EMF voltage measurements taken. The variable acc_speed/n is the average value of the sampled back EMF voltages.

The actual speed of the DC motor ($\omega$act) can be calculated by the following formula;

$$\omega_{act} = \frac{2\pi}{\text{Time\_Count}} \cdot gear\_ratio [rad/s] \qquad \text{Eq. 3}$$

where the Time_Count is time of one revolution of the toner metering device as detected by sensor 184 and gear_ratio is the gear ratio from the motor to the paddle via gear train 130.

The back EMF constant, Ke, can be calculated by the following formula:

$$Ke = Ke_{est} \frac{\omega_{est}}{\omega_{act}} [V \cdot s/rad] \qquad \text{Eq. 4}$$

where $Ke_{est}$ is the estimated back EMF constant before the calibration.

At block 442 the updated value for Ke is stored and replaces the value of $Ke_{est}$ used in Equations 2 and 4 when the calibration cycle is next repeated. The process then returns to block 404 where the motor 120 is stopped and return to the idle state.

Figure 5:
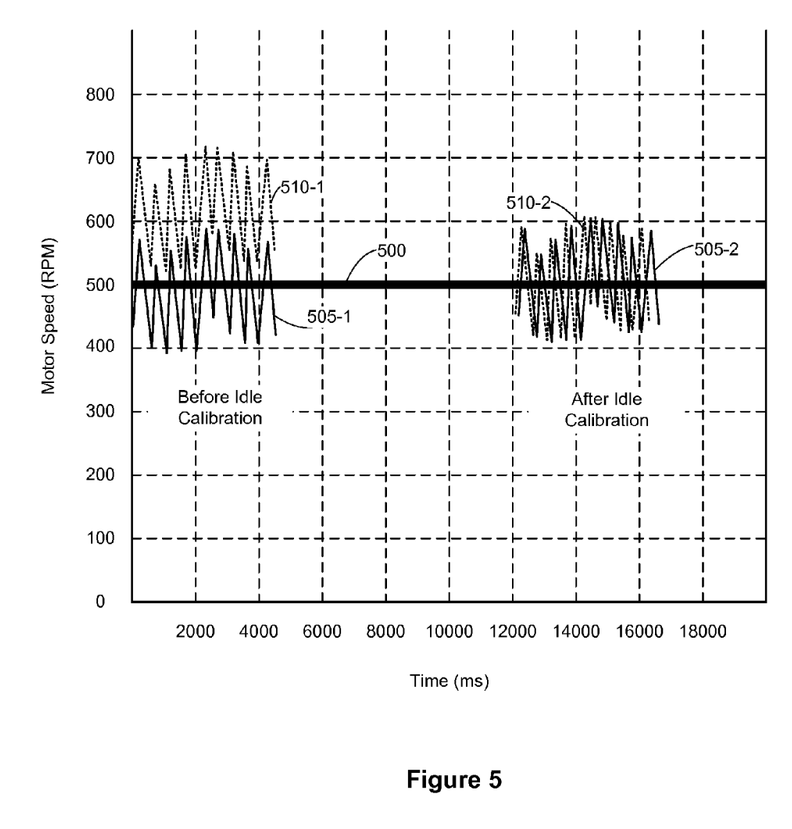
FIG. 5 is an illustration of actual motor versus motor speed using back EMF voltage control before and after performing the calibration method of the present invention.

Shown in FIG. 5 are two graphs of actual motor speed as calculated using the measured speed of the toner metering devices, the motor speed using back EMF measurements versus a desired set point speed. Curve 500 is the set point speed of 500 rpm. Curves 505-1 and 510-1 were generated prior to a calibration cycle during the idle state. Curve 505-1 is the motor speed using the back EMF measurement using the initial value for the back EMF constant $Ke_{est}$ while curve 510-1 is the actual motor speed. As shown, the actual speed was on average higher (at about 600 rpm) than the speed determined using the back EMF voltage measurements and the initial value for $Ke_{est}$ indicating a speed of about 500 rpm.

Curves 505-2 and 510-2 were generated after a calibration cycle during the idle state. Curve 505-2 is the motor speed using the back EMF measurement using the calculated value for the back EMF constant Ke while curve 510-2 is the actual motor speed. As shown, the actual speed and the speed determined using the back EMF voltage measures with the newer value for Ke as calculated by process 400 are in better agreement with each other, approximately with 5 percent error between actual versus measured speed, and with the set point of 500 rpm.

Referring now to FIGS. 6-8, various embodiments of toner metering devices used in toner containers are illustrated. In FIG. 6 both a toner paddle meter device and a toner auger metering device are shown. The toner cartridge 600 comprises a housing 601 having a toner reservoir 618 for holding a quantity of toner. Housing 601 may be viewed as having a top or lid 606 mounted on a base 602. Base 602 includes a bottom 608 having thereon first and second side walls or end walls 614, 616, connected to adjoining front and rear walls 610, 612. Top 606 may be ultrasonically welded to base 602 forming toner reservoir 618. Because the toner reservoir generally has the shape of a cylinder having a circular or oval, the interior surfaces of the bottom 608, front and rear walls 610, 612, and the top 606 may be said to form a circumferential wall. First and second end caps 620, 622 are also mounted to housing 601 at first and second side walls 614, 616, respectively, and include guides 624 to assist with inserting toner cartridge 600 into an imaging apparatus 22. A handle 607 may be provided on top 606 or base 602 of toner cartridge 600 to assist with insertion and removal of toner cartridge 600 from imaging apparatus 22.

Various drive gears are housed within a space formed between first end cap 620 and side wall 614, and various interlocks 625 and linkages may also be housed within the space formed between second end cap 622 and second side wall 616. A main interface gear 631 engages with a drive system containing a DC drive motor 120 in the imaging apparatus 22 that provides torque to main interface gear 631. A paddle assembly 650 may be rotatably mounted within toner reservoir 618 with first and second ends 661, 662 of a drive shaft 660 of paddle assembly 650 extending through aligned openings in side walls 114, 116, respectively. Paddle assembly 650 may have scrapers 670a, 670b, 680a, 680 that are used to deliver toner from reservoir 618 to an auger channel 628. A drive gear 633 is provided on the first end 661 of drive shaft 660 that engages with main interface gear 631 either directly or via one or more intermediate gears 634. By counting the rotation of the paddle assembly 650 an estimate of the toner remaining in the toner reservoir 618 may be made by controller 28.

A second toner metering device is auger 626 having first and second ends 626a, 626b, and a spiral screw flight 626c positioned in channel 628 extending along the width of front wall 110 between side walls 114, 116. Channel 128 is generally horizontal in orientation along with toner cartridge 600 when toner cartridge 600 is installed in the image forming device. First end 626a of auger 626 extends through first side wall 614 and is connected to gear 635 that engages with main interface gear 631 either directly or via one of more intermediate gears 632, 634. Channel 628 includes an open portion 628a in fluid communication with the toner reservoir 618 and an enclosed portion 628b. Open portion 628a extends from first side wall 614 toward second end 626b of auger 626. Enclosed portion 628b of channel 628 extends from second side wall 616 toward second end 626b of auger 626 and encloses a shutter assembly (not shown) and the second end 626b of auger 626. The shutter assembly is used to open and close an exit port located in the enclosed portion 628b of channel 628. Auger 626 is rotated to deliver toner received in channel 628 to a shutter assembly housed in enclosed portion 628b of channel 628 and out the exit port. Counting the rotational cycles of the auger 628 may be used to provide an estimate of the amount of toner remaining in the toner cartridge 600.

Shown in FIG. 7, is a sectional view of another example toner container 700, such as a toner cartridge, utilizing a toner metering roll. The toner container 710 comprises housing 712 defining therewithin two reservoirs, namely first upper reservoir 713 and second lower reservoir 714 for supplying image forming material, such as toner 715, to toner adder roll 717, which in turn supplies toner to developer roll 719 which then supplies toner to a photoconductive drum (not shown) within image apparatus 22. Doctor blade 720 ensures a uniform layer of toner on the surface of developer roll 719. Upper reservoir 713 may include paddles or agitators, represented in FIG. 7 by paddle 721, for assisting in agitating toner 715 in reservoir 713 and transferring toner to lower reservoir 714 as described more fully below.

Toner container 710 may be structured to contain black toner for a black only image apparatus (such as a printer). However, container 710 may comprise one of a plurality of similarly structured toner containers, such as the various toner cartridges included in a color imaging apparatus, all of which cartridges are generally of similar construction but distinguished by the toner color contained therein. A typical color imaging apparatus may include individual cartridges including respective toner colors of black, magenta, cyan, and yellow, each respective color forming an individual image of a single color that is combined in layered fashion with the other colors to create the final multi-colored image. Toner container 710 (and each of the other toner containers included in the image apparatus structured according to the invention) may include an image developer roll 719 that operatively contacts the photoconductive drum within an image apparatus 22 indicated by the dashed line 711

A toner metering roll mechanism 723 is disposed within an intermediate region 725 between upper reservoir 713 and lower reservoir 714. Metering roll mechanism 723 supplies toner 715 from reservoir 713 to reservoir 714 when controller 28 calls for toner, as through a toner level sensing device 735 disposed within reservoir 714. The sensing device may be any conventional type known in the applicable art as would be selected by one skilled in the art for inclusion in the overall container 710 structure. Metering roll mechanism 723 includes a toner metering roll 729 that is attached to a drive gear 737 shown separately in the perspective view (not to scale) in FIG. 8. Toner metering roll 729 is structured so as to facilitate the transfer of measured amounts of toner 715 from upper reservoir 713 to lower reservoir 714 during each cycle or revolution.

The transfer of toner 715 from reservoir 713 to reservoir 714 may be facilitated using a geared toner supply mechanism having any suitable structure as would occur to the skilled artisan practicing the invention such as represented in dashed lines as toner transfer mechanism 730, along with attached paddle 721 within reservoir 713 for agitating and moving toner 715 into toner metering mechanism 723. Toner metering mechanism 723 includes a toner metering roll 729 such as shown in the representative structure depicted in perspective in FIG. 8.

With reference now specifically to FIG. 8, one example of toner metering roll 729 may be a generally cylindrical in shape and include one or more axially spaced concave recesses 731 defined in the cylindrical surface of roller 729 by concave surfaces 733 having a radius of curvature. Recesses 731 have the substantially trough-like shape of an axial cylindrical section. Recesses 731 are shown in FIG. 8 as being aligned axially along the surface of metering roll 729, but it is understood that other axial and circumferential placements of recesses 731 as would occur to the skilled artisan practicing the invention, are contemplated herein about the entire 360 degree circumferential surface of and along the length of metering roll 729.

It is noted that metering roll 729 is shown as being generally cylindrical in shape with a substantially circular cross section. However, metering roll 729 could have a cross section of a different shape (i.e., oval, square, etc.) as would occur to the skilled artisan practicing the invention, such cross sections representing alternative embodiments of the invention.

Recesses 731 of roller 729 are of known volumetric size so as to facilitate the transfer of measured amounts of toner 715 from reservoir 713 to reservoir 714 with each rotation of metering roll 29. Accordingly, upon rotation of metering roll 729, each recess 731 is positioned alternately at a first position open to reservoir 713 where it is filled with toner 715 and at a second position (such as is shown in the figures) open to reservoir 714 where the toner is removed from recesses 731 as by rotation of a member 735. Toner consumption from toner container 710 may be monitored and approximated by counting the rotations of metering roll 729 using sensor assembly 180 as previously described.

In one example form, recesses 731 maybe described as each being in the general shape of a pocket defining a convex cylindrical shaped surface 733. In one form the radius of metering roll 29 may be about 8.4 mm and the radius of recesses 731 may be about 11 mm, providing a ratio of about 1.3. It is suggested that the radius of curvature of the concave surface 733 may be about 0.75 to 3.0 times the radius of curvature of metering roll 729. Selection of the curvature of metering roll 729 relative to the curvature of convex surface 733 may be made by one skilled in the applicable art practicing the invention, the specific selection not considered limiting of the invention or of the appended claims. Metering roll 729 may typically comprise a material such as high impact polystyrene, polycarbonate, acetol, metals or similar materials as would occur to the skilled artisan guided by these teachings.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. In an imaging apparatus having a toner container, a method of adjusting a back EMF constant Ke used in a speed control system for a DC motor connected via a gear train to a rotatable toner metering device, the method comprising:
   storing an initial value for Ke; and
   during a motor calibration cycle:
      measuring a time of at least one rotation of the toner metering device;
      making a plurality of back EMF measurements of the DC motor;
      averaging the plurality of back EMF measurements;
      calculating an estimated speed of the DC motor using the initial value of Ke and the average value of the plurality of back EMF measurements;

calculating an actual speed of the DC motor using the time of at least one rotation and a gear ratio of the connecting gear train;

adjusting the stored value of Ke by multiplying the stored value of Ke by the ratio of the estimated speed to the actual speed; and storing the adjusted value of Ke in place of the previously stored value for Ke for the use in a next motor calibration cycle.

2. The method of claim 1 wherein the motor calibration cycle is performed after an installation of a new toner container in the imaging apparatus.

3. The method of claim 1 wherein the motor calibration cycle is performed a predetermined amount of time after initial use of the toner container in the imaging apparatus.

4. The method of claim 1 wherein the motor calibration cycle is performed after a predetermined number of cycles of the toner metering apparatus.

5. The method of claim 1 wherein the motor calibration cycle is performed during an idle state of the DC motor.

6. In an imaging apparatus having a toner container, a method of adjusting a back EMF constant Ke used in a speed control system for a DC motor connected via a gear train to a rotatable toner metering device, the method comprising:

storing an initial value for Ke; and performing a motor calibration cycle upon the occurrence of a predetermined event and during the motor calibration cycle:

measuring a time of at least one rotation of the toner metering device using a motion sensor mounted adjacent the toner metering device;

making a predetermined number of back EMF measurements of the DC motor;

averaging the predetermined number of back EMF measurements;

calculating an estimated speed of the DC motor using the stored value of Ke and the average value of the predetermined number of back EMF measurements;

calculating an actual speed of the DC motor using the time of at least one rotation and a gear ratio of the connecting gear train;

adjusting the stored value of Ke based on multiplying the stored value of Ke by the ratio of the estimated speed to the actual speed; and storing the adjusted value of Ke in place of the previously stored value for Ke for the use in the next motor calibration cycle.

7. The method of claim 6 wherein the predetermined event is an installation of a new toner container in the imaging apparatus.

8. The method of claim 6 wherein the predetermined event is a predetermined amount of time after initial use of the toner container in the imaging apparatus.

9. The method of claim 6 wherein the predetermined event is after a predetermined number of cycles of the toner metering apparatus.

10. The method of claim 6 wherein the motor calibration cycle is performed during an idle state of the DC motor.

11. In an imaging apparatus having a toner container, a method of adjusting a back EMF constant Ke used in a speed control system for a DC motor connected via a gear train to a rotatable toner metering device used for measuring a quantity of toner fed from the toner container, the method comprising:

storing an initial value for Ke; and performing a motor calibration cycle upon the occurrence of a predetermined event and during a motor idle state and during the motor calibration cycle:

measuring a time of at least one rotation of the toner metering device using a motion sensor sensing rotation at the toner metering device using the motion of a flag mounted on the toner metering device to actuate the motion sensor;

during the time of at least one rotation is being measured making a plurality of back EMF measurements of the DC motor;

after measuring the time of the at least one rotation of the toner metering device averaging the plurality of back EMF measurements;

calculating an estimated speed of the DC motor using the average value of the back EMF measurements multiplied by the inverse of the initial value of Ke;

calculating an actual speed of the DC motor using the measured time of at least one rotation multiplied by a gear ratio of the connecting gear train;

adjusting the stored value of Ke based on multiplying the initial value of Ke by the ratio of the estimated speed to the actual speed; and storing the adjusted value of Ke in placed of the previously stored value for Ke for the use in the next motor calibration cycle.

12. The method of claim 11 wherein the predetermined event is an installation of a new toner container in the imaging apparatus.

13. The method of claim 11 wherein the predetermined event is a predetermined amount of time after initial use of the toner container in the imaging apparatus.

14. The method of claim 11 wherein the predetermined event is after a predetermined number of cycles of the toner metering apparatus.

* * * * *